Jan. 16, 1962  H. W. NEWBURN  3,016,935
PEACH PITTER TWISTING HEAD
Filed May 18, 1959
3 Sheets-Sheet 2
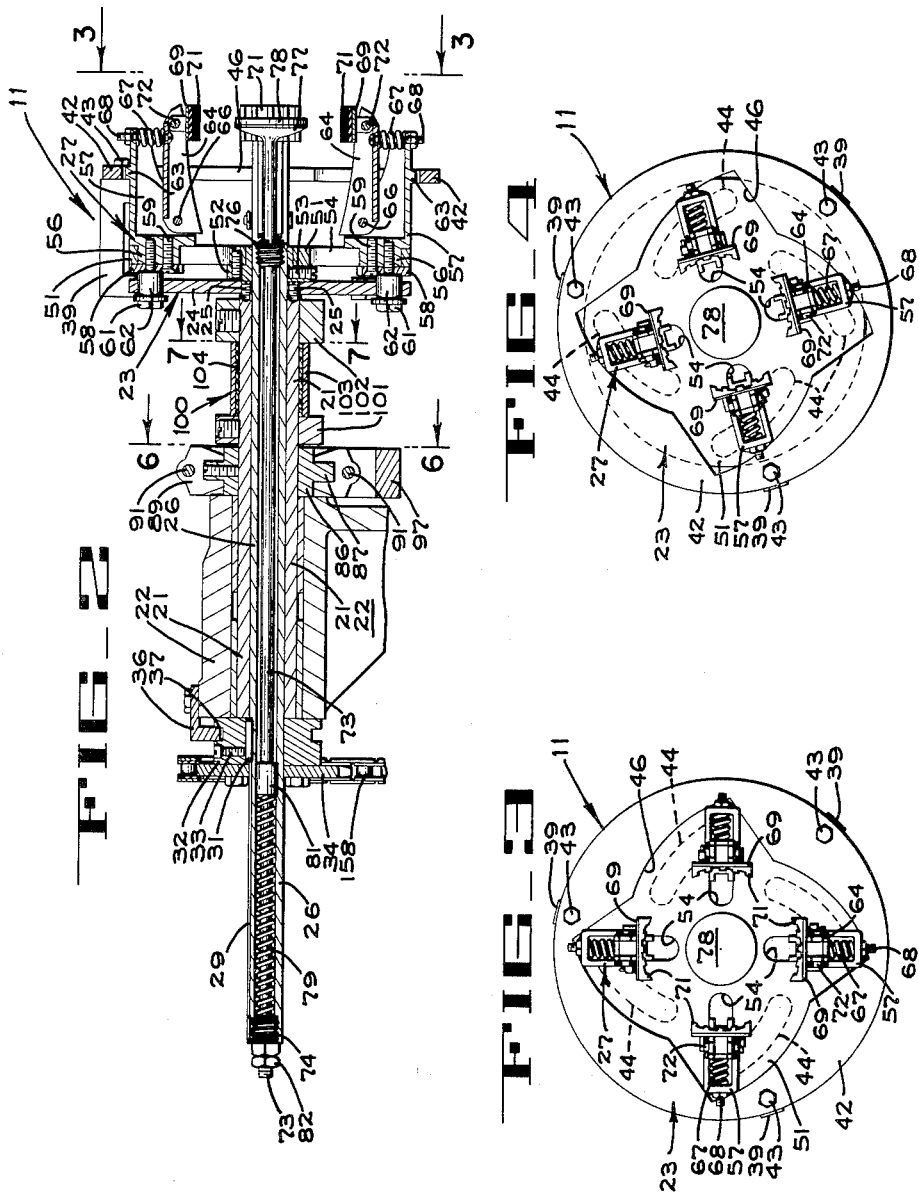
INVENTOR
HAROLD W. NEWBURN
BY Hans G. Hoffmeister
ATTORNEY Jan. 16, 1962 H. W. NEWBURN 3,016,935
PEACH PITTER TWISTING HEAD
Filed May 18, 1959 3 Sheets-Sheet 3
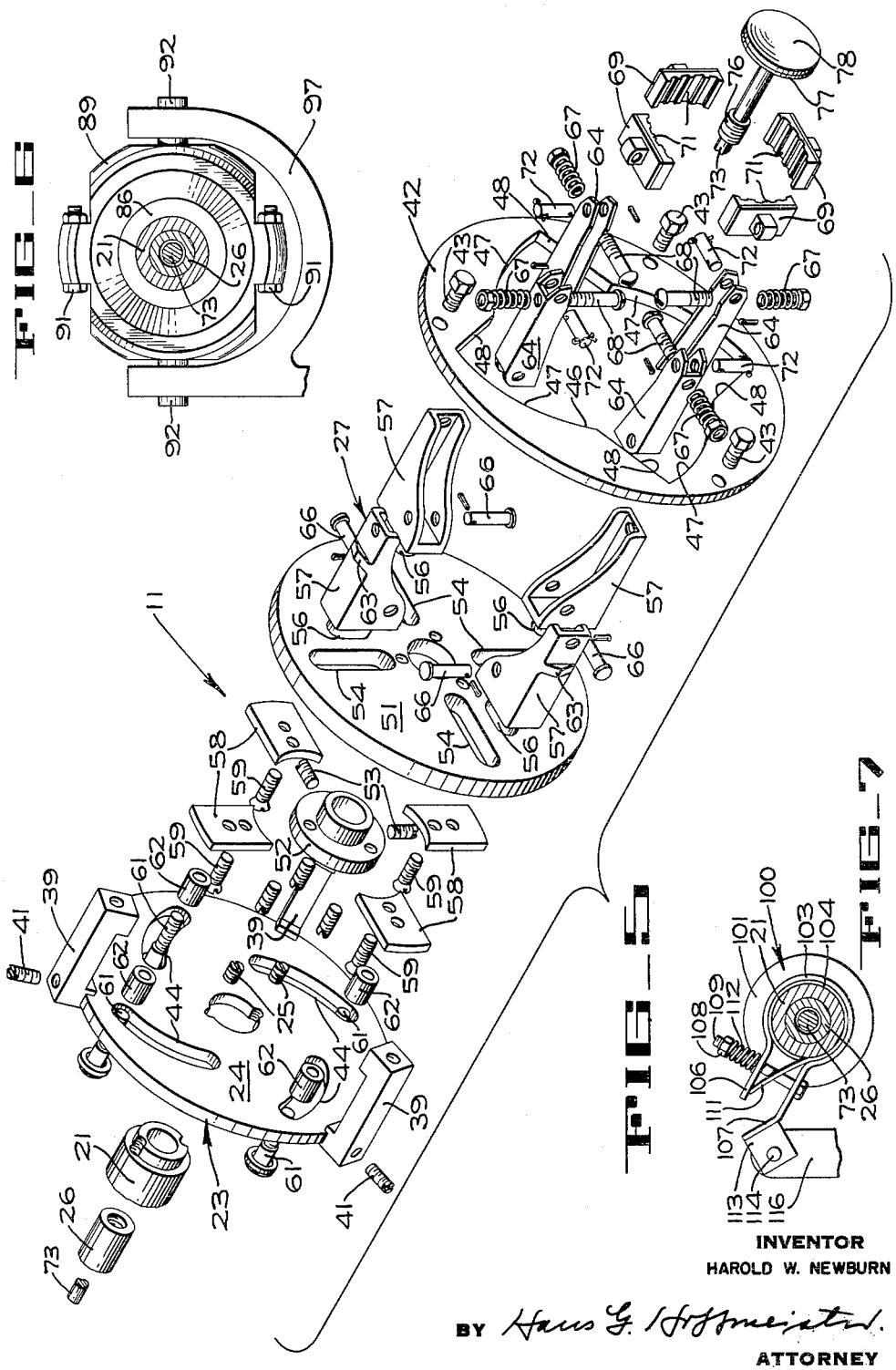
INVENTOR
HAROLD W. NEWBURN
BY Hans G. Hoffmeister
ATTORNEY United States Patent Office 3,016,935
Patented Jan. 16, 1962

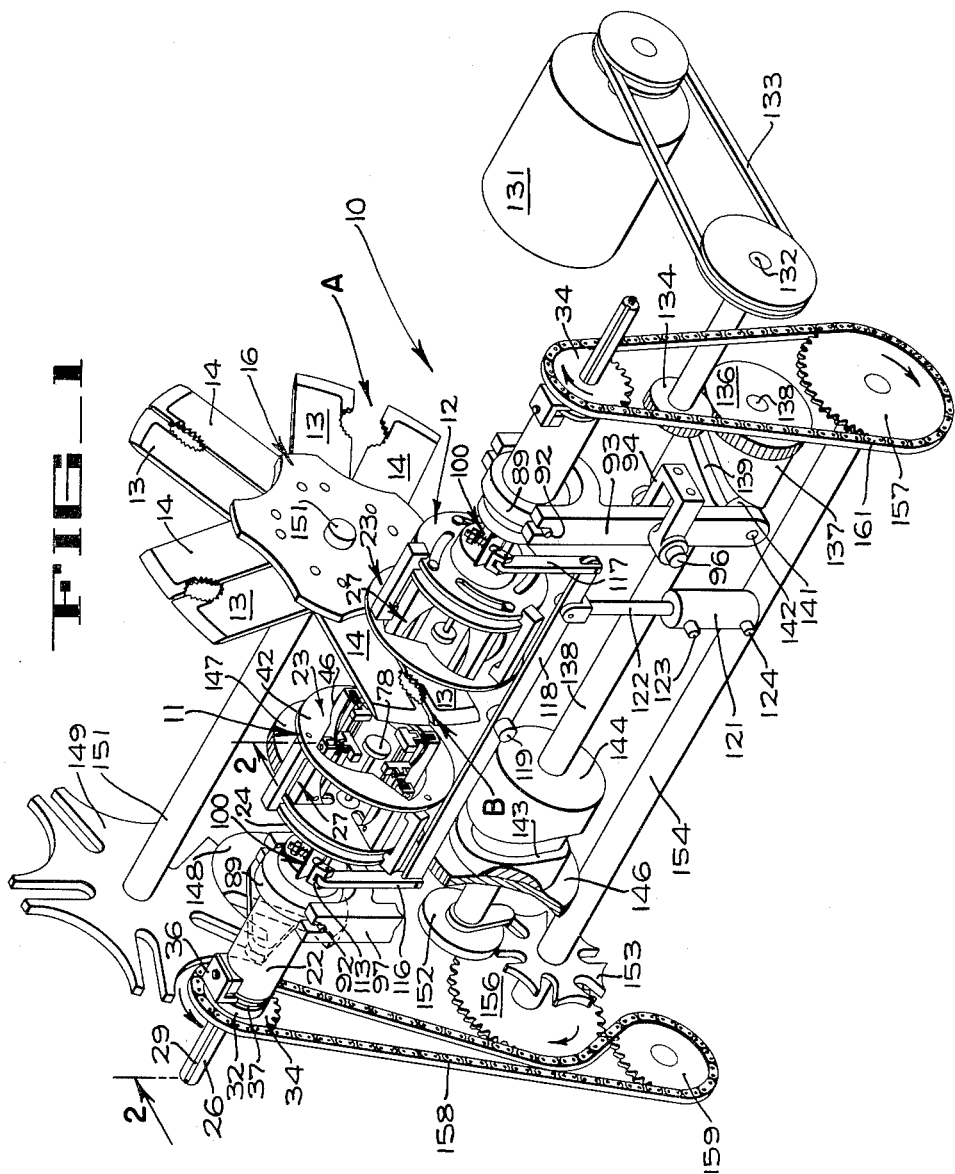

3,016,935
PEACH PITTER TWISTING HEAD
Harold W. Newburn, San Jose, Calif., assignor to FMC Corporation, a corporation of Delaware
Filed May 18, 1959, Ser. No. 813,747
17 Claims. (Cl. 146—28)

The present invention appertains to a fruit preparation machine and more particularly relates to an apparatus for gripping and twisting the halves of a peach free from its pit.

It is an object of the present invention to provide an improved fruit preparation machine.

Another object is to provide an improved apparatus for gripping and twisting a peach half free from its pit while the pit is held in a fixed position.

Another object is to provide an improved apparatus for gripping and twisting peach halves of different size and different degrees of firmness from their pits without injury to the flesh of the peach halves.

These and other objects and advantages of the present invention will become apparent from the following description and the accompanying drawings, in which:

FIGURE 1 is a diagrammatic perspective, with parts broken away, of the fruit preparation machine of the present invention showing a pair of twisting heads and the associated drive mechanism.

FIGURE 2 is an enlarged vertical section taken along lines 2—2 of FIGURE 1.

FIGURE 3 is an end elevation of the twisting head looking in the direction of the arrows 3—3 of FIGURE 2 and showing the parts of the head in position to receive a peach therein.

FIGURE 4 is an end elevation, similar to FIGURE 3, but showing the twisting head rotated and with the parts thereof in a peach gripping position.

FIGURE 5 is an exploded view of the twisting head of FIG. 2.

FIGURE 6 is an enlarged vertical section taken along lines 6—6 of FIGURE 2.

FIGURE 7 is an enlarged vertical section taken along lines 7—7 of FIGURE 2.

The fruit preparation machine 10 (FIG. 1) of the present invention includes a pair of axially aligned, spaced twisting heads 11 and 12. Cooperating pairs of blades 13 and 14 of a pit gripping assembly 16 are intermittently indexed between the heads 11 and 12 and carry a peach from a receiving station A to a peach twisting station B which is disposed between the twisting heads 11 and 12. A peach is placed on the blades 13 and 14 at station A when the blades are in an open position. As the assembly is intermittently indexed, the blades are closed to substantially bisect the peach and firmly grip the pit between the blades 13 and 14 by the time station B is reached. Each peach is positioned on the blades at station A, and the blades are opened and closed by any suitable mechanism such as that disclosed in the application for patent of Drake et al., Serial No. 691,620, which application is assigned to the assignee of the present invention.

After the peach has been indexed at station B, the twisting heads 11 and 12 are cammed towards each other and certain parts thereof are disposed around the adjacent halves of the peach. The twisting heads 11 and 12 are then twisted in opposite directions to first tighten certain parts against the peach halves to firmly grip the same, and then to twist the peach halves free of the pit. The twisting heads 11 and 12 are then moved away from each other, the separated peach halves and pits are released, and a new peach is indexed to station B.

Each twisting head is identical, therefore, the description of the twisting head 11 (FIGS 2, 3, 4 and 5) will be sufficient to disclose the construction of both heads.

The twisting head 11 comprises a drive tube 21 (FIG. 2) which is journalled in a suitably bushed, stationary frame member 22 and has an outer cam carrier assembly 23 at one end, said carrier including a cam plate 24 secured on one end by set screws 25. Within the tube 21 is journalled a tubular drive shaft 26 having an inner gripper carrier assembly 27 secured on one end adjacent the cam carrier assembly 23. A keyway 29 is formed in the tubular shaft 26 to slideably receive a key 31 that is locked in a hub 32 by a cap screw 33. A drive sprocket 34 is bolted on the hub 32 and the hub is slideably received on the shaft 26 but is prevented from rotation relative thereto by the key 31. An L-shaped slide 36 is bolted to the fixed frame member 22 and has a leg which is slideably received in an annular groove 37 in the hub 32 to prevent movement of the same away from the frame member 22.

The cam plate 24 (FIGS. 2 and 5) has three brackets 39 secured thereon by set screws 41. A second cam plate 42 is bolted to the ends of the brackets 39 by cap screws 43. Four equally spaced arcuate slots 44 in the cam plate 24 are each formed about a center of curvature, the centers being equally spaced from each other and from the axis of rotation of the tubular shaft 26. A large star-shaped opening 46 (FIGS. 3 and 4) in the cam plate 42 is defined by four arcuate camming surfaces 47 connected together by straight edges 48. The arcuate surfaces 47 are disposed adjacent the arcuate slots 44, and each surface is transcribed about the same center of curvature as the nearest adjacent slot 44 but at a slightly larger radius.

As shown in FIGURES 2 and 5, the gripper carrier assembly 27 includes a mounting disc 51 which is bolted to a hub 52 that is secured by set screws 53 to the tubular shaft 26. The disc 51 has four equally spaced, radially extending slots 54 formed therein. Each slot 54 slideably receives a block 56 formed on one end of a cam arm 57. Each cam arm 57 projects outwardly from the disc 51 and is held thereagainst by a slide 58 which is secured to the block 56 by a screw 59. In addition to the screw 59, a shouldered cap screw 61 is screwed into each block 56 to hold the associated slide 58 in place. Each of the cap screws 61 extends through one of the arcuate slots 44 in cam plate 24 and has a bushing 62 which is rotatable in its associated slot 44. A hardened cam follower 63 on each cam arm 57 is disposed in position to ride against one of the camming surfaces 47 of cam plate 42. Thus, it is apparent that rotation of the shaft 26 relative to the tube 21 will cause the bushings 62 to ride in their associated slots 44 and the cam followers 63 to ride against the camming surfaces 47 to move the cam arms 57 radially inward or outward depending upon the direction of rotation of the shaft 26 relative to the tube 21.

Each of the cam arms 57 has a gripping finger 64 pivotally connected adjacent one end thereof by a pin 66. A compression spring 67 is disposed between the other end of each finger 64 and its associated cam arm 57 and is held in place by a bolt 68. Each finger 64 has a shoe 69 pivotally connected to its distal end, and each shoe 69 has a grooved arcuate gripping element 71 of any suitable resilient material such as rubber bonded thereto. The shoes 69 are pivotally connected to their associated fingers 64 by pins 72.

When the fingers 64 are cammed inwardly, as illustrated in FIG. 4, the gripping elements on the shoes 69 engage the peach and firmly grip the same. The shoes 69 pivot about the pins 72 so that they conform generally to the curvature of the peach at the point of contact. The springs 67 make it possible to firmly grip those peaches which are not symmetrical about the axis of rotation of the shaft 26.

An elongated rod 73 (FIG. 2) extends through the tubular shaft 26 and is slideably received in bushings 74 and 76 screwed in the ends of the shaft 26. A disc 77 having a resilient pad 78 bonded thereon is welded to the end of the rod 73 and is disposed between the gripping fingers 64. A compression spring 79 is fitted around the rod 73 and is disposed between the bushing 74 and a collar 81 fixed on the rod 73. A nut 82 screwed on the rod 73 abuts the bushing 74 to hold the rod 73 under spring tension in the tubular shaft 26. When a peach half enters the twisting head 11 to be gripped by the gripping elements 71, the peach contacts the pad 78 on the rod 73 and moves the same to the left (FIG. 2) against the urging of the spring 79. The pad 78 provides back-up pressure for the peach half which prevents the tearing of excessive peach meat from the peach half adjacent the twisting axis of the same when the peach half is twisted free of the pit.

In order to cause the twisting heads 11 and 12 to reciprocate, a collar 86 having an annular flange 87 thereon is keyed on the tube 21 of each of the heads 11 and 12. Each flange 87 is slideably received in a groove in a split collar 89 (FIG. 6), the halves of which are secured together by bolts 91. A pair of trunnion pins 92 in the split collar 89, which is associated with the twisting unit 12, is engaged by a yoke 93 (FIG. 1) which is pivotally mounted to a stationary frame member 94 by a pin 96. Pivotal actuation of the yoke 93 in one direction moves the twisting head 12 toward the pit gripping assembly 16, and pivotal actuation of the yoke 93 in the opposite direction moves the twisting head 12 away from the assembly 16. Likewise, the trunnion pins 92 in the collar 89 associated with the twisting head 11 are engaged by a yoke 97 which is pivotally mounted to a fixed frame portion (not shown). The yoke 97 is pivotally actuated in timed relation with the yoke 93, by structure to be described presently, in such a way that the twisting heads 11 and 12 are moved towards each other at the same time and away from each other at the same time.

After the twisting heads 11 and 12 have been moved into position to grip the opposite halves of a peach, each of the cam assemblies 23 is rotated relative to its associated gripper assembly 27 to initially tighten the gripper assemblies on the peach halves.

In order to rotate the cam assemblies 23 relative to the gripper assemblies 27, each of the twisting heads 11 and 12 is provided with a friction drive unit 100. Each of the friction drive units 100 is identical, therefore, the description of the drive unit 100 associated with the twisting head 11 will suffice for both. This friction drive unit 100 comprises a pair of spaced collars 101 and 102 (FIG. 2) secured on the drive tube 21. A metal drive band 103 (FIGS. 2 and 7) is positioned between the collars 101 and 102 with a liner 104 of friction material, such as rubber-coated canvas, disposed between the drive band 103 and the tube 21. The drive band 103 (FIG. 7) has two free end portions 106 and 107 that are pressed together by a nut 108 on a bolt 109 that passes freely through openings in the end portions 106 and 107 and through an opening in an end 111 of the friction liner 104. The nut 108 applies pressure to the band 103 through a spring 112 that is disposed between the nut 108 and the end portion 106. The other end portion of the drive band 103 has a bifurcated connection 113 which is adapted to receive a pin 114 for pivotally mounting a push rod 116. When the push rod 116 is pushed upwardly, the drive band 103 is rotated clockwise (FIG. 7) and, through the friction liner 104, the band drives the tube 21 clockwise.

A push rod 117 (FIG. 1), which is similar to the push rod 116, is pivotally connected to the friction drive unit 100 which is associated with twisting head 12. The push rods 116 and 117 are pivotally connected to opposite ends of a rocker arm 118 which arm 118 is pivotally mounted on the frame of the machine 10 by a pin 119. A power cylinder 121 is mounted on the frame of the machine 10 and has its actuating element 122 pivotally connected to the rocker arm 118. When fluid under pressure is directed into the cylinder 121 through a port 123, the rocker arm 118 is pivoted in a clockwise direction (FIG. 1) thereby rotating, by means of the friction drive units 100, the cam plate assembly 23 of the twisting head 11 in a clockwise direction and the cam plate assembly of the twisting head 12 in a counterclockwise direction, thereby camming the shoes 69 (FIG. 4) of the gripping elements 27 into gripping engagement with the associated peach halves disposed therebetween. Conversely, when fluid under pressure is directed into the cylinder 121 (FIG. 1) through a port 124, the rocker arm 118 is pivoted in a counterclockwise direction, the cam plate assembly 23 of the twisting head 11 is rotated in a counterclockwise direction while the assembly 23 of the head 12 is rotated in a clockwise direction thereby returning the shoes 69 to their furthest open position.

After the twisting heads 11 and 12 have been moved towards each other and the gripping assemblies 27 have been moved into gripping engagement with the peach halves as above described, the peach halves are twisted free of the pit by rotation of the twisting heads 11 and 12 in a direction opposite to that of the initial gripping movement of the cam plate assemblies 23. It is apparent that, during this twisting operation, the tubes 21 of the heads 11 and 12 will rotate within the friction drive units 100 after overcoming the frictional resistance of the same. It is also apparent that by varying the frictional resistance of the units 100, i.e., by tightening or loosening the nuts 108, the gripping pressure exerted by the shoes 69 against the peach halves may be increased or decreased.

The drive mechanism for rotating the twisting heads 11 and 12 and for moving the same towards and away from each other is shown in FIGURE 1. The drive mechanism comprises a motor 131 arranged to drive a shaft 132 by means of a belt and pulley drive 133. A gear 134 keyed to the shaft 132 is in mesh with a gear 136 formed on a cylindrical cam 137 that is keyed to a shaft 138. The cam 137 has a camming groove 139 which receives a roller follower 141 rotatably mounted on a pin 142 on the lower end of the yoke 93. As the cylindrical cam 137 is rotated, the yoke 93 will be pivoted to move the twisting head 12 toward and away from the twisting station B.

The twisting head 11 is reciprocated due to pivotal movement of its associated yoke 97 which has a roller follower (not shown) disposed in a camming groove 143 of a second cylindrical cam 144 that is keyed to the shaft 138. The camming grooves of the cylindrical cams 137 and 144 are so arranged that the twisting heads are reciprocated simultaneously but in opposite directions.

A gear 146 is integrally formed on the cam 144 and is disposed in mesh with a gear 147 keyed to a shaft (not shown). A Geneva driver 148 is also keyed to the shaft which carries the gear 147 and is arranged to intermittently index a Geneva gear 149 that is keyed to a shaft 151 on which the pit gripping assembly 16 is secured. Thus, the pit gripping assembly 16 is indexed in timed relation with the reciprocation of the twisting heads 11 and 12.

A Geneva driver 152 is keyed to the shaft 138 and is arranged to intermittently index a Geneva gear 153 that is keyed to a shaft 154 on which two sprockets 156 and 157 are keyed. The sprocket 156 drives the sprocket 34 of the twisting head 11 through a chain 158 which is also trained around an idler sprocket 159. The sprocket 157 drives the sprocket 34 of the twisting head 12 through a chain 161. Due to the use of the idler sprocket 159, the sprockets 34 of the twisting heads 11 and 12 are rotated in opposite directions, as indicated by the arrows in FIG.

1, so that the peach halves engaged by the heads will be twisted in opposite directions. Since the same motor 131 intermittently drives the pit gripping assembly 16 and intermittently reciprocates and rotates the twisting heads 11 and 12, it is apparent that these parts are driven in timed relation.

In the operation of the fruit preparation machine 10, a peach to be pitted is placed between the blades 13 and 14 of the pit gripping assembly 16 at station A. The pit gripping assembly is then intermittently advanced until the peach is advanced to the twisting station B with its flesh bisected to the pit and with the pit firmly gripped between the blades 13 and 14. While the peach is held in this position, the twisting heads 11 and 12 are moved inwardly by the cylindrical cams 137 and 144, the camming surfaces having dwell portions adapted to hold the heads 11 and 12 at the twisting station B until the twisting operation has been completed.

Shortly after the shoes 69 of each head 11 and 12 have been disposed around their associated halves of the peach, pressurized fluid is directed into the power cylinder 121 through the connection 123 causing the rocker arm 118 to pivot in a clockwise direction as viewed in FIGURE 1. Accordingly, the friction drive units 100 frictionally engage the tubes 21 to rotate the cam plate assembly 23 of the unit 11 in a clockwise direction (FIG. 1) and the cam plate assembly of the unit 12 in a counter-clockwise direction. This movement of the assemblies 23 cams the shoes 69 into gripping engagement with the peach halves. The stroke of the cylinder 121 is sufficient to firmly engage the shoes 69 against the smallest peach to be pitted, it being apparent that the friction drives 100 will slip during the final portion of the stroke when larger peaches are being gripped. It is also apparent that the gripping pressure against the peach can be easily changed by adjustment of the nut 108. During this initial gripping operation, the gripper assembly 27 is held from rotation by the Geneva driver 152 and connecting drive parts thereby causing the shoes 69 to move radially inward to firmly grip the peach before any twisting motion of the shoes relative to the peach is attempted.

When the initial gripping movement has been completed, the sprockets 34 are rotated causing both the gripper assembly 27 and the cam assembly 23 of the twisting head 11 to rotate in a counter-clockwise direction (FIG. 1) and the assemblies 23 and 27 of the twisting head 12 are rotated in a clockwise direction thereby severing the gripped peach halves from the pit. The cylindrical cams 137 and 144 then move the twisting heads 11 and 12 away from the station B. As the heads 11 and 12 move away from the station B, the disc 77 associated with each twisting head resiliently urges the peach half from its associated twisting head. Pressurized fluid is then directed into the lower connection 124 of the power cylinder 121 causing the rocker arm 118 to pivot in a counter-clockwise direction (FIG. 1) whereby the cam plate assembly 23 of the twisting head 11 is rotated counter-clockwise and the assembly 23 of the twisting head 12 is rotated clockwise to return the shoes 69 to their open position as illustrated in FIGURE 3.

The two twisting heads 11 and 12 have been shown and described as operating simultaneously and as being rotated in opposite directions. It is to be understood that the heads may be operated independently from each other and may be rotated in the same direction.

From the foregoing description, it is apparent that the twisting heads of the present invention are arranged to positively grip peach halves of different size with equal force. The gripping shoes are arranged to be moved radially into firm gripping engagement with the peach halves to assure that a firm grip is provided before the twisting operation begins, thereby eliminating the possibility that the shoes will slip over the surface of the peach. It is also apparent that the gripping pressure of the twisting heads may be easily varied in order to grip fruit of different average firmness with sufficient force to twist the same but not injure the fruit.

While one embodiment of the present invention has been shown and described, it will be understood that various changes and modifications may be made without departing from the spirit of the invention or the scope of the appended claims.

Having thus described the present invention and the manner in which the same is to be used, what is claimed as new and desired to be protected by Letters Patent is:

1. In a fruit preparation machine, a twisting head comprising a support structure, a plurality of fruit gripping shoes disposed in circular array about a central axis, means mounting said shoes on said structure for movement as a unit in a circular path about said axis and mounting said shoes for individual movement from an open position adapted to receive a fruit segment therein to a closed position in engagement with the fruit segment, rotary power means operatively connected to said support structure for moving said shoes into frictional gripping engagement with the fruit segment, and second power means operatively connected to said mounting means for maintaining said frictional engagement and for moving said shoes in said circular path to rotate the fruit about said axis.

2. In a fruit preparation machine, a twisting head comprising a support structure mounted for rotation, a plurality of fruit gripping shoes, means mounting said shoes on said structure for rotation relative thereto about a predetermined axis and for radial movement from an open position adapted to receive a fruit segment therein to a closed position in engagement with a segment of a fruit held on said axis, first power means operatively connected to said support structure for rotating the support structure in one direction relative to said mounting means for moving said shoes into frictional gripping engagement with the fruit segment, and second power means operatively connected to said mounting means for rotating said mounting means and said support structure in a direction opposite to said first mentioned direction for maintaining said frictional engagement and for applying a twisting force on said shoes.

3. In a twisting head for a fruit preparation machine, a first and a second carrier mounted for relative rotation about a predetermined axis, a plurality of arms connected to said carriers and arranged to be moved radially relative to said axis upon relative rotation between said first and said second carriers, a shoe mounted on each arm for pivotal movement about an axis which lies in a plane perpendicular to said first mentioned axis, said shoes being arranged to be moved by said arm into gripping engagement with a fruit disposed therebetween, first drive means connected to said first carrier for rotating said first carrier in a first direction, and second drive means connected to said second carrier for holding said second carrier against rotation during rotation of said first carrier, whereby said shoes are moved radially inwardly toward said first mentioned axis into gripping contact with said fruit, and thereafter for rotating both carriers and the gripped fruit in the opposite direction.

4. In a twisting head for a fruit preparation machine, a first and a second carrier mounted for rotation about a predetermined axis, a plurality of arms connected to said carriers and arranged to be moved radially relative to said axis upon relative rotation between said first and said second carriers, a finger pivotally supported on each of said arms, resilient means disposed between each finger and its supporting arm and arranged to urge the fingers away from their supporting arms, a shoe mounted on each finger for pivotal movement about an axis which lies in a plane perpendicular to said first mentioned axis and arranged to be moved by said arm into gripping engagement with a fruit disposed therebetween, first drive means connected to said first carrier for rotating said first carrier in a first direction, and second drive means connected to said second carrier for holding said second carrier against rotation during rotation of said first carrier, whereby said shoes are moved radially inwardly toward said first mentioned axis into gripping contact with said fruit, and thereafter for rotating both carriers and the gripped fruit in the opposite direction.

5. In a twisting head for a fruit preparation machine, an outer and an inner carrier mounted for relative rotation about a predetermined axis, said outer carrier including a cam plate having a plurality of arcuate slots each formed about a center spaced from said axis, said inner carrier including a disc having a plurality of radial slots therein, a plurality of arms connected to said carriers, each arm having a portion slideably received in said radial and said arcuate slots and arranged to be moved radially toward or away from said axis upon relative rotation between said outer and said inner carriers, a shoe mounted on each arm and arranged to be moved by said arm into gripping engagement with a fruit positioned on said axis, first drive means connected to said outer carrier for rotating said outer carrier in a first direction, and second drive means connected to said inner carrier for holding said inner carrier against rotation during rotation of said outer carrier, whereby said shoes are cammed radially inward toward said axis into gripping engagement with the fruit and thereafter, for rotating both of said carriers and the gripped portion of said fruit in the opposite direction.

6. In a twisting head for a fruit preparation machine, an outer and an inner carrier mounted for relative rotation about a predetermined axis, said outer carrier including a cam plate having an arcuate slot formed about a center disposed from said axis, said inner carrier including a disc having a radial slot therein, an arm connected to said carriers and having a portion slideably received in said radial and said arcuate slots and arranged to be moved radially upon relative rotation between said outer and said inner carriers, a finger pivotally mounted on said arm, resilient means for resiliently urging said finger away from said arm, a shoe mounted on said finger for pivotal movement about an axis which lies in a plane that is perpendicular to said first mentioned axis, first drive means connected to said outer carrier for rotating said outer carrier in a first direction, and second drive means connected to said inner carrier for holding said inner carrier against rotation during rotation of said outer carrier, whereby said shoe is cammed radially inward toward said first mentioned axis into gripping engagement with said fruit, and thereafter for rotating both of said carriers and the gripped portion of said fruit in the opposite direction.

7. In a twisting head for a fruit preparation machine, an outer and an inner carrier mounted for relative rotation about an axis, said outer carrier including a pair of spaced parallel cam plates each having an arcuate camming surface therein formed about a center disposed from said axis, said inner carrier including a disc having a radial slot therein, an arm connected to said carriers and having a portion slideably received in said radial slot and bearing against said arcuate camming surfaces and arranged to be moved radially upon relative rotation between said outer and said inner carriers, a shoe mounted on said arm and arranged to be moved by said arm into gripping engagement with a fruit, first drive means connected to said outer carrier for rotating said outer carrier in a first direction, and second drive means connected to said inner carrier for holding said inner carrier against rotation during rotation of said outer carrier whereby said shoe is cammed radially inward toward said axis into gripping engagement with said fruit and thereafter for rotating both of said carriers with the gripped portion of said fruit in the opposite direction.

8. In a twisting head for a fruit preparation machine, an outer and an inner carrier mounted for relative rotation about an axis, said outer carrier including a pair of spaced parallel cam plates each having an arcuate camming surface therein formed about a center disposed from said axis, said inner carrier including a disc having a radial slot therein, an arm connected to said carriers and having a portion slideably received in said radial slot and bearing against said arcuate camming surfaces and arranged to be moved radially upon relative rotation between said outer and said inner carriers, a finger pivotally mounted on said arm, resilient means for urging said finger away from said arm, a shoe mounted on said finger for pivotal movement about an axis which lies in a plane that is perpendicular to said first mentioned axis, first drive means connected to said outer carrier for rotating said outer carrier in a first direction, and second drive means connected to said inner carrier for holding said inner carrier against rotation during rotation of said outer carrier, whereby said shoe is cammed radially inward toward said first mentioned axis into gripping engagement with said fruit, and thereafter for rotating both of said carriers and the gripped portion of said fruit in the opposite direction.

9. In a fruit preparation machine for removing the meat half of a peach from its pit after the meat of the peach has been substantially bisected along a plane and after the pit has been held in fixed position, the improvement which comprises a shaft journalled for rotation about an axis disposed normal to said plane and in alignment with said pit, a plurality of shoes arranged to be moved into gripping engagement with the peach half, means mounting said shoes on said shaft for radial movement toward or away from said peach half, a tube journalled on said shaft, a cam carried by said tube and operatively connected to said mounting means to move said shoes radially inward against said peach upon rotation of said tube relative to said shaft in one direction, a friction drive unit operatively connected to said tube, means for actuating said friction drive unit to drive said tube in said one direction to move said shoes into gripping engagement with the peach half, and means for rotating said shaft in the other direction to twist the peach half free from the pit.

10. In a fruit preparation machine for removing the meat half of a peach from its pit after the peach meat has been substantially bisected along a plane and the pit held in fixed position, a twisting head comprising, a shaft mounted for rotation about an axis which passes through the pit and is normal to said plane, a disc secured to one end of said shaft and having a plurality of radially extending slots therein, an arm slideably received in each slot and arranged to be moved radially towards said peach half, a shoe carried by each arm and disposed in a position to be moved against said peach half, a tube journalled on said shaft, a cam secured to said tube and operatively connected to said arms and arranged upon rotation in one direction relative to said shaft to move said arms radially inward thereby moving said shoes into gripping engagement with said peach half, friction drive means operatively connected to said tube, means for actuating said friction drive means to drive said tube in said one direction to move said shoes into gripping engagement with the peach half.

11. In a fruit preparation machine for removing the meat half of a peach from its pit after the meat of the peach has been substantially bisected along a plane and after the pit has been held in fixed position, the improvement which comprises a shaft journalled for rotation about an axis disposed normal to said plane and in alignment with said pit, a disc secured on said shaft and having a plurality of radially extending slots therein, an arm slideably mounted in each of said slots, a shoe mounted on each of said arms for pivotal movement about an axis which lies in a plane that is perpendicular to the axis of said shaft, a tube journalled on said shaft, a cam carried by said tube and operatively associated with said arm to move said shoes radially inward against said peach upon rotation of said tube relative to said shaft in one direction, a friction drive unit operatively connected to said tube, means for actuating said friction drive unit to drive said tube in said one direction to move said shoes into gripping engagement with the peach half, and means for rotating said shaft in the other direction to twist the peach half free from the pit.

12. In a twisting head for a fruit preparation machine, a first and a second carrier mounted for relative rotation about a predetermined axis, a plurality of shoes connected to said carriers and arranged to be moved radially toward or away from said axis upon relative rotation between said first and said second carriers to grip a fruit disposed therebetween, a disc slideably carried by said carriers and movable along said predetermined axis into engagement with the gripped fruit, resilient means for urging said disc against said fruit to support the fruit adjacent said predetermined axis, first drive means connected to said first carrier for rotating said first carrier in a first direction, and second drive means connected to said second carrier for initially holding said second carrier against rotation during rotation of said first carrier, whereby said shoes are moved radially inwardly toward said axis into gripping contact with said fruit, and for thereafter rotating both of said carriers and the gripped fruit in the opposite direction.

13. In a twisting head for a fruit preparation machine, an outer and an inner carrier mounted for relative rotation about a predetermined axis, said outer carrier including a cam plate having a star-shaped opening partially defined by arcuate edges formed about centers spaced from said axis, said inner carrier including a disc having a plurality of radial slots therein, a plurality of arms connected to said carriers, each arm having a portion slideably received in one of said radial slots and another portion slideable against one of said arcuate edges and arranged to be moved radially toward or away from said axis upon relative rotation between said outer and said inner carriers, a shoe mounted on each arm and arranged to be moved by said arm into gripping engagement with a fruit positioned on said axis, first drive means for rotating said outer carrier in a first direction, and second drive means for initially holding said inner carrier against rotation during rotation of said outer carrier, whereby said shoes are cammed radially inward toward said axis into gripping engagement with the fruit, and for thereafter rotating both of said carriers and the gripped portion of said fruit in the opposite direction.

14. In a twisting head for a fruit preparation machine, an outer and an inner carrier mounted for relative rotation about a predetermined axis, said outer carrier including a cam plate having a star-shaped opening partially defined by arcuate edges formed about centers spaced from said axis, said inner carrier including a disc having a plurality of radial slots therein, a plurality of arms connected to said carriers, each arm having a portion slideably received in one of said radial slots and another portion slideable against one of said arcuate edges and arranged to be moved radially toward or away from said axis upon relative rotation between said outer and said inner carriers, and a shoe mounted on each arm and arranged to be moved by said arm into gripping engagement with a fruit positioned on said axis.

15. In a twisting head for a fruit preparation machine, an outer and an inner carrier mounted for relative rotation about an axis, said outer carrier including a pair of parallel cam plates each having an arcuate camming surface formed about a common center spaced from said axis with the radius of one of said camming surfaces being larger than the other, said inner carrier including a disc having a radial slot therein, an arm connected to said carriers and having a portion slideably received in said radial slot and slideably engaging said arcuate camming surfaces and arranged to be moved radially upon relative rotation between said outer and said inner carriers, and a shoe mounted on said arm for movement with said arm into gripping engagement with a fruit.

16. In a twisting head for a fruit preparation machine, a first and a second carrier mounted for relative rotation about a predetermined axis, a plurality of shoes connected to said carriers in a circular pattern around said axis and arranged to be moved radially toward or away from said axis upon relative rotation between said first and second carriers to grip a fruit disposed therebetween, frictional drive means connected to said first carrier for rotating said first carrier in a first direction, and intermittent rotary drive means connected to said second carrier and timed with said first drive means, said intermittent drive means being inactive upon actuation of said first carrier for holding said second carrier against rotation during rotation of said first carrier for causing relative motion between said carriers to move said shoes radially inwardly toward said axis into gripping contact with the fruit, said intermittent drive means when activated being arranged to initially urge said jaws into firmer gripping contact with said fruit and thereafter being arranged to rotate both of said carriers and the gripped fruit in the opposite direction about said axis.

17. In a twisting head for a fruit preparation machine, a plurality of fruit gripping shoes disposed in a circular pattern around a predetermined axis, means mounting said shoes for joint movement in a circular path about said axis and for individual movement radially inwardly toward said axis, camming means in engagement with said shoes, means for effecting relative movement between said camming means and said mounting means for moving said shoes radially toward said axis to grip a fruit disposed between said shoes and means for actuating said mounting means to move said shoes in said circular path while gripping the fruit, the movement of said shoes in said circular path being effective to cause said camming means to urge said shoes radially inwardly toward said axis.

References Cited in the file of this patent
UNITED STATES PATENTS

| | | |
|---|---|---|
| 980,462 | Warner | Jan. 3, 1911 |
| 1,726,685 | Tottenham et al. | Sept. 3, 1929 |
| 1,777,417 | Ridley | Oct. 7, 1930 |
| 2,775,279 | Perrelli | Dec. 25, 1956 |